(12) United States Patent
Pak et al.

(10) Patent No.: US 7,718,570 B2
(45) Date of Patent: May 18, 2010

(54) CARBON MOLECULAR SIEVE AND METHOD FOR MANUFACTURING THE SAME

(75) Inventors: Chan-ho Pak, Seoul (KR); Ji-man Kim, Kyungki-do (KR); Hyung-ik Lee, Kyungki-do (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 1151 days.

(21) Appl. No.: 10/949,525

(22) Filed: Sep. 27, 2004

(65) Prior Publication Data

US 2005/0036935 A1 Feb. 17, 2005

Related U.S. Application Data

(62) Division of application No. 10/627,743, filed on Jul. 28, 2003, now Pat. No. 6,812,187.

(30) Foreign Application Priority Data

Feb. 13, 2003 (KR) .................................. 2003-9097

(51) Int. Cl.
C01B 31/08 (2006.01)
(52) U.S. Cl. .................................. 502/416; 423/445 R
(58) Field of Classification Search ............. 423/445 R; 502/416
See application file for complete search history.

(56) References Cited

U.S. PATENT DOCUMENTS

| | | | |
|---|---|---|---|
| 4,329,260 A | 5/1982 | Lester et al. | |
| 4,425,316 A | 1/1984 | Hucke | |
| 5,319,114 A | 6/1994 | Gaffney et al. | |
| 5,626,637 A * | 5/1997 | Baker | 48/127.3 |
| 5,744,421 A * | 4/1998 | Robinson et al. | 502/416 |
| 6,043,183 A * | 3/2000 | Alford | 502/180 |
| 6,471,761 B2 | 10/2002 | Fan et al. | |
| 6,585,948 B1 * | 7/2003 | Ryoo et al. | 423/445 R |
| 6,670,304 B2 * | 12/2003 | Chang | 502/418 |
| 2002/0187896 A1 | 12/2002 | Ryoo et al. | |

FOREIGN PATENT DOCUMENTS

| | | |
|---|---|---|
| JP | 62223012 | 10/1987 |
| JP | 07155589 | 6/1995 |
| JP | 9110409 | 4/1997 |
| JP | 11217209 | 8/1999 |
| JP | 2001118753 | 4/2001 |
| JP | 200229860 | 1/2002 |
| JP | 2002170574 | 6/2002 |
| JP | 2003034516 | 2/2003 |
| JP | 2003206112 | 7/2003 |
| KR | 2001-1127 | 1/2001 |
| KR | 2002-84372 | 11/2002 |

OTHER PUBLICATIONS

Ji Man Kim, et al., Synthesis of MCM-48 Single Crystals, Chem. Commun., 1998, pp. 259-260, Royal Society of Chemistry, Cambridge, England.
Mi Jeong Kim et al., Synthesis and Pore Size Control of Cubic Mesoporous Silica SBA-1, Chemical Mater., 1999, pp. 487-491, vol. 11, No. 2, American Chemical Society, Washington D.C., USA.
Ji Man Kim et al., Synthesis of Highly Ordered Mesoporous Silica Materials Using Sodium silicate and Amphiphilic Block Copolymers, Chem, Commun., 2000, pp. 1159-1160, Royal Society of Chemistry, Cambridge, England.
Jinwoo Lee et al., "Synthesis of a New Mesoporous Carbon and Its Application to Electrochemical Double-Layer Capacitors," Chem. Commun., 1999, pp. 2177-2178, Royal Society of Chemistry, Cambridge England. (no month available).
Jae-Seung Lee et al., "Synthesis of Mesoporous Silicas of Controlled Pore Wall Thickness and Their Replication to Ordered Nanoporous Carbons with Various Pore Diameters", National Creative Research Initiative Center for Functional Nanomaterials and Department of Chemistry, Korea Advanced Institute of Science and Technology, J. Am Chem, Soc., vol. 124, No. 7, Oct. 11, 2001, 2 pages, Republic of Korea.
Office Action issued by Japanese Patent Office on Sep. 15, 2009 in corresponding application.

* cited by examiner

*Primary Examiner*—Stuart Hendrickson
(74) *Attorney, Agent, or Firm*—Buchanan Ingersoll & Rooney PC

(57) ABSTRACT

A method for manufacturing a carbon molecular sieve with increased microporosity; a method for manufacturing a carbon molecular sieve with increased microporosity and improved structural regularity; a carbon molecular sieve with increased microporosity; a carbon molecular sieve with increased microporosity and improved structural regularity; a catalyst for a fuel cell using the carbon molecular sieve; and a fuel cell using the catalyst are provided.

4 Claims, 2 Drawing Sheets

CARBON MOLECULAR SIEVE AND METHOD FOR MANUFACTURING THE SAME

This application claims the priority of Korean Patent Application No. 2003-9097, filed on Feb. 13, 2003, in the Korean Intellectual Property Office, the disclosure of which is incorporated herein in its entirety by reference.

BACKGROUND OF THE INVENTION

1. Field of the Invention

The present invention relates to a molecular sieve and more particularly, to a carbon molecular sieve. The present invention also relates to a fuel cell and more particularly, to a catalyst and a catalyst support for a fuel cell.

2. Description of the Related Art

Originally, the term "molecular sieve" was the trade name of a synthetic zeolite commercially manufactured by Linde Ltd. (USA). A molecular sieve has excellent adsorption capacity due to its many fine pores with uniform diameter. As derived from its literal meaning, a molecular sieve is used to selectively sieve molecules.

Presently, the term "molecular sieve" is an generic name in the field of science technology and refers to a porous material in which uniform-sized pores are arranged in a three dimensional manner.

A molecular sieve selectively adsorbs a certain size of molecules due to its uniform pore size. Therefore, a molecular sieve can be widely used as a catalyst, a catalyst support, or an adsorbent.

A carbon molecular sieve is mainly made of a carbon material. A carbon molecular sieve has many advantages, such as excellent thermal stability, hydrothermal stability, chemical resistance, and lipophilicity, when compared to a metal oxide based molecular sieve such as zeolite. A carbon molecular sieve can also be used for various purposes, such as a catalyst support, an adsorbent, a sensor, and an electrode material.

As one example of a method for synthesis of a carbon molecular sieve, there is disclosed a pyrolysis process of a natural vegetable material, such as coconut, or a synthetic polymer. According to this method, however, pore size and porosity can only be limitedly increased by pyrolysis temperature adjustment and post-treatment with oxygen.

Another example of a method for synthesis of a carbon molecular sieve is disclosed in Korean Patent Application Laid-Open Publication Nos. 2001-1127 and 2002-84372. According to these methods, a mesoporous silica molecular sieve is used as a template. A carbohydrate is subjected to adsorption into the template, polymerization and pyrolysis. The template is then removed to thereby produce a carbon molecular sieve with a structural regularity of uniform-sized pores. However, a disadvantage exists in that a silica molecular sieve used as a template must be newly designed to adjust the surface area of the carbon molecular sieve and the volume ratio of its micropores and mesopores. In addition, it is difficult to control the volume ratio between micropores and mesopores.

Fuel cells are clean energy sources capable of reducing dependence on fossil energy, with a high output density and high energy conversion efficiency. In addition, fuel cells can be operated at room temperature and can be miniaturized and packed. Therefore, fuel cells can be widely used in the fields of zero emission vehicles, domestic power systems, mobile communication equipment, medical instruments, military equipment, aerospace equipment, and portable electronic devices. A polymer electrolyte membrane fuel cell (PEMFC) and a direct methanol fuel cell (DMFC) are electric power generating systems that allow electrochemical reaction of hydrogen or methanol, water, and oxygen to produce direct current electricity. These fuel cells comprise an anode and a cathode which receive a liquid/gaseous reactant and a proton conducting membrane interposed between the two electrodes. At the anode, an anode catalyst dissociates hydrogen or methanol to generate protons. The generated protons are transported through the proton conducting membrane to the cathode. At the cathode, the protons react with oxygen by the cathode catalyst. Therefore, in such structured fuel cells, the role of a catalyst is very important. Currently, in a PEMFC, platinum (Pt) particles supported on a carbon support are used as both anode and cathode catalysts. In DMFCs, platinum-ruthenium (Pt—Ru) black is used as an anode catalyst and Pt particles by themselves or Pt particles supported on a carbon support are used as a cathode catalyst. Because metal black by themselves provide excellent catalytic activity, a supported metal catalyst system is rarely used in a DMFC. However, because a large portion of costs incurred in a DMFC is caused by a catalyst, in considering cost effectiveness, the amount of a used catalyst needs to be decreased. Therefore, many efforts have been made to research a carbon support capable of providing improved catalyst activity and dispersion over a currently used carbon support with no structural regularity, in order to reduce the catalyst amount used in an anode and a cathode.

SUMMARY OF THE INVENTION

The present invention provides a method for manufacturing a carbon molecular sieve with increased microporosity.

The present invention also provides a method for manufacturing a carbon molecular sieve with increased microporosity and improved structural regularity.

The present invention also provides a carbon molecular sieve with increased microporosity.

The present invention also provides a carbon molecular sieve with increased microporosity and improved structural regularity.

The present invention also provides a catalyst for a fuel cell containing the aforementioned carbon molecular sieve.

The present invention also provides a fuel cell employing the aforementioned catalyst.

According to an aspect of the present invention, there is provided a method for manufacturing a carbon molecular sieve, comprising the steps of (a) impregnating pores of a mesoporous silica molecular sieve, used as a template, with a mixture of a silica oligomer, a condensable or polymerizable carbon-containing compound, used as a carbon precursor, and a liquid carrier; (b) polymerizing the carbon precursor to form a carbon precursor polymer within the pores of the template; (c) carbonizing the carbon precursor polymer using pyrolysis; and (d) removing the template and the silica oligomer using a solution capable of dissolving silica selectively.

According to another aspect of the present invention, there is provided a method for manufacturing a carbon molecular sieve, comprising the steps of (a) impregnating micropores of an ordered mesoporous silica molecular sieve, used as a template, having the mesopores and the micropores that are responsible for the connections between the mesopores, with a first mixture comprising a condensable or polymerizable carbon-containing compound, used as a carbon precursor, and a liquid carrier; (b) polymerizing the carbon precursor within the micropores of the template to form a carbon precursor polymer within the micropores of the template; (c)

impregnating the mesopores of the template with a second mixture comprising a silica oligomer, a condensable or polymerizable carbon-containing compound, used as a carbon precursor, and a liquid carrier; (d) polymerizing the carbon precursor within the mesopores of the template to form a carbon precursor polymer within the mesopores of the template; (e) carbonizing the carbon precursor polymers within the template using pyrolysis; and (f) removing the template and the silica oligomer using a solution capable of dissolving silica selectively.

According to another aspect of the present invention, there is provided a carbon molecular sieve having mesopores and micropores. The total volume of pores, with a size of 80 nm or less, is 1.0 $cm^3/g$ or more and microporosity is 35% or more.

According to another aspect of the present invention, there is provided a catalyst for a fuel cell comprising a porous catalyst support and catalytic metals dispersed on the catalyst support, wherein the catalyst support is the aforementioned carbon molecular sieve.

According to yet another aspect of the present invention, there is provided a fuel cell using the aforementioned catalyst.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
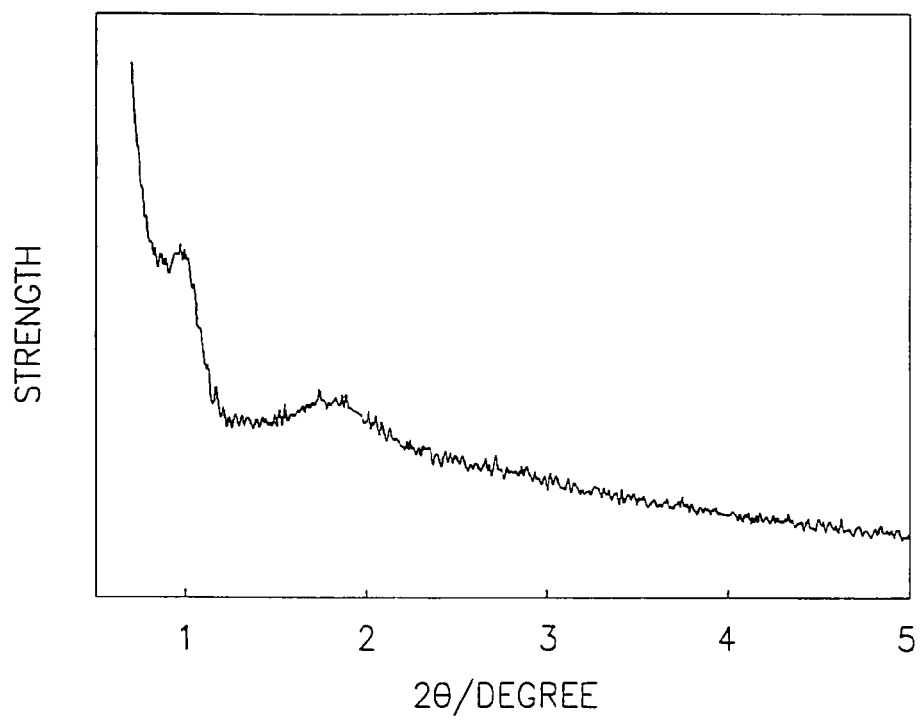
FIG. 1A is an X-ray diffraction (XRD) pattern of a carbon molecular sieve according to an embodiment of the present invention.

A method for manufacturing a carbon molecular sieve according to a first aspect of the present invention comprises the steps of (a) impregnating pores of a mesoporous silica molecular sieve, used as a template, with a mixture of a silica oligomer, a condensable or polymerizable carbon-containing compound, used as a carbon precursor, and a liquid carrier; (b) polymerizing the carbon precursor to form a carbon precursor polymer within the pores of the template; (c) carbonizing the carbon precursor polymer using pyrolysis; and (d) removing the template and the silica oligomer using a solution capable of dissolving silica selectively.

In this method, when the mixture containing the silica oligomer and the carbon precursor undergoes polymerization and pyrolysis, the mesopores of the template are filled with solid carbon that includes the silica oligomer. In step (d), the template and the silica oligomer are removed altogether. Removing the silica oligomer creates micropores. In addition to the micropores created by removing the silica oligomer, many other micropores are present in the solid. The microporosity and micropore size of a carbon molecular sieve can be adjusted by controlling the particle size and content of the silica oligomer.

As used herein, the term "mesopore" refers to a pore with a size of about 1 to about 80 nm and the term "micropore" refers to a pore with a size of about 1 nm or less.

Hereinafter, the method for manufacturing a carbon molecular sieve according to a first aspect of the present invention will be described in more detail.

Examples of the mesoporous silica molecular sieve used as a template include a cubic MCM-48 (Ia3d), another cubic SBA-1 (Pn3m), SBA-16 (Im3m), KIT-1 or MSU-1 having a three-dimensional disordered pore network, and SBA-15 of which one-dimensional mesopores are interconnected through micropores.

MCM-48 may be prepared using a method introduced by Kim et al. [Chem. Commun., 1998, 259]. SBA-1 may be prepared using a method introduced by Kim and Ryoo [Chem. Mater., 1999, 11, 487]. SBA-15 and SBA-16 may be prepared using a method introduced by Kim and Stucky [Chem. Commun., 2000, 1159].

The silica oligomer may be obtained by hydrolysis of tetraalkylorthosilicate. More particularly, the silica oligomer may be prepared by reacting tetraethylorthosilicate (TEOS) with an aqueous solution of hydrochloric acid. There are no particular limitations to an average particle size of the silica oligomer. The silica oligomer can have different average particle sizes depending on the degree of polymerization. After the removal of the silica oligomer, micropores with the same size as the average particle size of the silica oligomer are formed on the carbon molecular sieve. For example, a silica oligomer with an average particle size of about 0.5 to about 5 nm may be used. In this case, a carbon molecular sieve having the increased porosity of pores with a size of about 0.5 to 5 nm can be obtained. In order to increase the porosity of micropores with a size of about 1 nm or less on a carbon molecular sieve, it is preferable to limit the average particle size of the silica oligomer to about 1 nm or less.

The carbon precursor is a condensable or polymerizable carbon-containing compound. Examples of the carbon precursor include a carbohydrate and a monomer.

A carbohydrate is classified into monosaccharide, oligosaccharide, and polysaccharide. Preferably, monosaccharide, oligosaccharide, or a mixture thereof is used. Representative examples of monosaccharide include glucose, fructose, mannose, galactose, ribose, and xylose. They may be used alone or in combination. Oligosaccharide contains two or more monosaccharide units joined by a glycoside bond. The term, "oligosaccharide" is a general name that can describe disaccharide through decasaccharide. Oligosaccharide may be classified into a simple oligosaccharide containing the same monosaccharides and a complex oligosaccharide containing two or more different monosaccharides. Oligosaccharides which exist in the free state in nature are mainly disaccharides. Exemplary disaccharides are sucrose, which is contained in sugar canes; maltose, which is a product obtained by amylase hydrolysis of starch and is a raw material of wheat-gluten; and lactose, which is found in mammal's milk.

A reducing group and a hydroxyl group on a carbohydrate or a hydroxyl group on a compound except for a carbohydrate may undergo a dehydrocondensation process.

A representative example of the monomer used as the carbon precursor is furfuryl alcohol.

The liquid carrier acts as a dispersing medium for the silica oligomer, a solvent for dissolving the carbon precursor, and a transport medium for transporting the carbon precursor and the silica oligomer into the pores of the template. The liquid carrier may be selected from water, an organic solvent, and a mixture thereof. Preferably, the organic solvent is alcohols.

More preferably, the alcohol is ethanol. Furfuryl alcohol may be used as both the carbon precursor and the liquid carrier. Furfuryl alcohol used as the carbon precursor, may act as the liquid carrier by itself.

The mixture may further comprise an acid. The acid catalyzes the condensation or polymerization of the carbon precursor. The acid may be selected from sulfuric acid, hydrochloric acid, nitric acid, sulfonic acid, a derivative thereof, and a mixture thereof. Representative sulfonic acid is methylsulfonic acid.

There are no particular limitations to the content of each component in the mixture, as long as the objects of the present invention are accomplished. However, it is preferable that the content of each component in the mixture is as follows.

If the content of the silica oligomer is too low, microporosity is slightly increased. On the other hand, if it is too high, the structure of the resultant carbon molecular sieve may be destroyed. Therefore, it is preferable that the content of the silica oligomer is within a range of about 1 to about 40 parts by weight based on 100 parts by weight of the carbon precursor.

If the content of the liquid carrier is too low, it is difficult to impregnate the template with the mixture. On the other hand, if it is too high, the filling density of carbonaceous components in the template may be significantly reduced. For this reason, disadvantageously, steps (a) and (b) must be overly repeated. Therefore, it is preferable that the content of the carrier is within a range of about 300 to about 1,000 parts by weight based on 100 parts by weight of the carbon precursor.

If the content of the acid is too low, the facilitation effect of the condensation or polymerization of the carbon precursor by the acid addition may be slight. On the other hand, because the facilitation effect is not continuously increased in proportion to the added amount of the acid, excess addition of the acid is also not preferable. Therefore, it is preferable that the content of the acid is within a range of about 1 to about 30 parts by weight based on 100 parts by weight of the carbon precursor.

In step (a), the pores of the template, i.e., the pores of the mesoporous silica molecular sieve are filled with the mixture of the silica oligomer, the condensable or polymerizable carbon-containing compound used as a carbon precursor, and the liquid carrier. Various impregnation processes may be used. For example, the mixture and the template can be simply mixed to initiate a contact with each other. Consequently, through such contact, the template is impregnated with the mixture.

In step (b), the carbon precursor, filled in the template, undergoes polymerization. After the polymerization, the carbon precursor polymer is formed within the pores of the template. The polymerization of the carbon precursor may be accomplished by heating. If the heating temperature is too low, the polymerization is slightly carried out. While, if it is too high, the uniformity of the obtained carbon molecular sieve may be decreased. Therefore, it is preferable that the heating temperature for the polymerization is within a range of about 50 to about 250° C. The heating may be divided into two steps, i.e., first heating and second heating. For example, the first heating may be carried out at a temperature range of about 50 to about 150° C. and the second heating at a temperature range of about 150 to about 250° C. During the heating, the carbon precursor undergoes polymerization. At the same time, the liquid carrier may be dried.

In step (c), the carbon precursor polymer within the pores of the template is carbonized by pyrolysis. For this, the template containing the carbon precursor polymer may be subjected to heating at about 400 to about 1,400° C. under a non-oxidizing atmosphere. The non-oxidizing atmosphere may be selected from a vacuum atmosphere, a nitrogen atmosphere, and an inert gas atmosphere. During the carbonizing process, the liquid carrier and/or acid are removed by evaporation or decomposition.

In step (d), the template and the silica oligomer are removed using a solution capable of dissolving silica. Examples of the solution include an aqueous fluoric acid solution and an aqueous sodium hydroxide solution. The silica is converted to soluble silicate by alkaline melting or carbonate fusion, or the silica reacts with fluoric acid (HF) to form very erosive $SiF_4$. According to the type of the silica molecular sieve used as the template, the template and the silica oligomer may be treated several times with the silica dissolving solution, or may be treated with a silica dissolving solution which further comprises ethanol. When the template is removed, a carbon molecular sieve is obtained. Furthermore, the silica oligomer contained in the carbon molecular sieve is also removed, thus the microporosity of the carbon molecular sieve is increased.

Before step (c), steps (a) and (b) may be repeated once or more. Thus, a larger amount of the carbon precursor polymers may be formed in the pores of the template.

Hereinafter, the method for manufacturing a carbon molecular sieve according to a second aspect of the present invention will be described.

The method for manufacturing a carbon molecular sieve according to the second aspect of the present invention comprises the steps of (a) impregnating micropores of an ordered mesoporous silica molecular sieve, used as a template, having the mesopores and the micropores that provide the connections between the mesopores, with a first mixture of a condensable or polymerizable carbon-containing compound, used as a carbon precursor, and a liquid carrier; (b) polymerizing the carbon precursor within the micropores of the template to form a carbon precursor polymer within the micropores of the template; (c) impregnating the mesopores of the template with a second mixture of a silica oligomer, a condensable or polymerizable carbon-containing compound, used as a carbon precursor, and a liquid carrier; (d) polymerizing the carbon precursor within the mesopores of the template to form a carbon precursor polymer within the mesopores of the template; (e) carbonizing the carbon precursor polymers within the template using pyrolysis; and (f) removing the template and the silica oligomer using a solution capable of dissolving silica selectively.

This method is characterized in that an ordered mesoporous silica molecular sieve having mesopores and micropores in which the micropores provide connections between the mesopores, is used as a template and the micropores and mesopores of the template are filled with different mixtures. That is, the silica oligomer is contained in the mesopores but not in the micropores of the template.

A carbon molecular sieve manufactured according to the second aspect of the present invention comprises carbon meso-rods and carbon micro-rods. The carbon micro-rods provide connections between the carbon meso-rods. Each carbon meso-rod has a diameter corresponding to the size of each mesopore of the template and each carbon micro-rod has a diameter corresponding to the size of each micropore of the template. Due to the absence of the silica oligomer, the microporous carbon rods have strength sufficient to maintain the structural regularity of the carbon molecular sieve. On the other hand, the carbon meso-rods have increased microporosity due to the spaces created by the removal of the silica oligomer.

According to the second aspect of the present invention, the ordered mesoporous silica molecular sieve having mesopores and micropores in which the micropores provide connections between the mesopores is used as a template. Illustrative examples are SBA-15 and SBA-16.

An average particle size of the silica oligomer may be about 0.5 to about 5 nm. Accordingly, an obtained carbon molecular sieve contains mesoporous carbon rods with the increased ratio of pores with a size of about 0.5 to about 5 nm. In order to increase micropores with a size of about 1 nm or less in a carbon molecular sieve, it is preferable that the average particle size of the silica oligomer is about 1 nm or less.

The carbon precursors and carriers, as used in the first and the second mixtures, may be the same as mentioned above.

The first and the second mixtures may further comprise an acid. The acid may be selected from sulfuric acid, hydrochloric acid, nitric acid, sulfonic acid, a derivative thereof, and a mixture thereof.

There are no particular limitations to the content of each component in the first mixture provided that each component can accomplish the objects of the present invention. However, it is preferable that the content of each component in the first mixture is as follows.

If the content of the liquid carrier in the first mixture is too low, it is difficult to impregnate the template with the first mixture. On the other hand, if it is too high, the filling density of carbonaceous components in the template may be significantly reduced, and thus disadvantageously, impregnating and polymerizing must be repeated several times. Therefore, it is preferable that the content of the carrier in the first mixture is within a range of about 300 to about 1,000 parts by weight based on 100 parts by weight of the carbon precursor in the first mixture.

If the content of the acid in the first mixture is too low, the facilitation effect of the condensation or polymerization of the carbon precursor by the acid addition may be slight. On the other hand, because the facilitation effect is not continuously increased in proportion to the added amount of the acid, excess addition of the acid is also not preferable. Therefore, it is preferable that the content of the acid in the first mixture is within a range of about 1 to about 30 parts by weight based on 100 parts by weight of the carbon precursor in the first mixture.

There are no particular limitations to the content of each component in the second mixture as long as the objects of the present invention are accomplished. However, it is preferable that the content of each component in the second mixture is as follows.

If the content of the silica oligomer in the second mixture is too low, microporosity is barely increased. On the other hand, if it is too high, the structure of the obtained carbon molecular sieve may be destroyed. Therefore, it is preferable that the content of the silica oligomer in the second mixture is within a range of about 1 to about 40 parts by weight based on 100 parts by weight of the carbon precursor in the second mixture.

If the content of the liquid carrier in the second mixture is too low, it is difficult to impregnate the template with the second mixture. On the other hand, if it is too high, the filling density of carbonaceous components in the template may be significantly reduced, thus disadvantageously, impregnating and polymerizing must be repeated several times. Therefore, it is preferable that the content of the carrier in the second mixture is within a range of about 300 to about 1,000 parts by weight based on 100 parts by weight of the carbon precursor in the second mixture.

If the content of the acid in the second mixture is too low, the facilitation effect of the condensation or polymerization of the carbon precursor by the acid addition may be slight. On the other hand, because the facilitation effect is not continuously increased in proportion to the added amount of the acid, excess addition of the acid is also not preferable. Therefore, it is preferable that the content of the acid in the second mixture is within a range of about 1 to about 30 parts by weight based on 100 parts by weight of the carbon precursor in the second mixture.

In step (a), the micropores of the template are filled with the first mixture. Various impregnation processes may be used. For example, the first mixture and the template can be simply mixed to initiate a contact with each other. Through a capillary phenomenon caused by such contact, the template is impregnated with the first mixture. In order to selectively fill the micropores of the template with the first mixture, it is preferable to allow the volume of the first mixture to approximate to that of the micropores of the template. For example, the content of the carbon precursor in the first mixture may be about 10 to about 50 parts by weight based on 100 parts by weight of the carbon precursor in the second mixture.

In step (b), the first mixture-containing template may be heated at a temperature range of about 50 to about 250° C. The heating may comprise (b-1) first heating the first mixture-containing template at a temperature range of 50 to 150° C. and (b-2) second heating the previously heated template at a temperature range of 150 to 250° C.

In step (d), the second mixture-containing template may be heated at a temperature range of about 50 to about 250° C. The heating may comprise (d-1) first heating the second mixture-containing template at a temperature range of 50 to 150° C. and (d-2) second heating the previously heated template at a temperature range of 150 to 250° C.

In step (e), the template containing the carbon precursor polymer may be subjected to heating at about 400 to about 1,400° C. under a non-oxidizing atmosphere. The non-oxidizing atmosphere may be selected from a vacuum atmosphere, a nitrogen atmosphere, and an inert gas atmosphere.

The silica dissolving solution in step (f) may be an aqueous fluoric acid or an aqueous sodium hydroxide solution.

Before step (e), steps (c) and (d) may be repeated once or more.

Other detailed descriptions of the second aspect of the present invention are as described in the first aspect of the present invention.

As used herein, the term "microporosity" refers to the volume percentage of micropores with a size of 1 nm or less to the total volume of pores with a size of 80 nm or less. In carbon molecular sieves which are manufactured according to the embodiments of the present invention and comprise mesopores and micropores, the total volume of pores with a size of 80 nm or less is about 1.0 $cm^3/g$ or more, and the microporosity is about 35% or more.

The method according to the second aspect of the present invention provides an ordered carbon molecular sieve containing carbon meso-rods and carbon micro-rods. The carbon micro-rods provide connections between the carbon meso-rods. The carbon meso-rods have a diameter corresponding to the size of the mesopores of the template. The carbon micro-rods have a diameter corresponding to the size of the micropores of the template. The carbon meso-rods form the internal structure of the carbon molecular sieve while in a state of being supported by the carbon micro-rods. The spaces between the carbon meso-rods provide substantially uniform sized mesopores. The carbon meso-rods have increased microporosity due to the removal of the silica oligomer.

The carbon molecular sieve of the present invention may be used for various purposes, including a catalyst carrier, an adsorbent, a sensor, and an electrode material.

A carbon molecular sieve of the present invention may be used in a catalyst for a fuel cell. Generally, a catalyst for a fuel cell may comprise a porous catalyst support and catalytic metals positioned on pores of the catalyst carrier. According to the present invention, a catalyst for a fuel cell uses the aforementioned carbon molecular sieve as the catalyst support. The catalytic metals may be titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tin (Sn), platinum (Pt), ruthenium (Ru), palladium (Pd), tungsten (W), iridium (Ir), osmium (Os), rhodium (Rh), niobium (Nb), tantalum (Ta), lead (Pb), or a mixture thereof. The catalyst for a fuel cell of the present invention may be prepared, for example, using a method comprising impregnating a porous catalyst support with a catalytic metal precursor solution and reducing the catalytic metal precursor. Such a method is disclosed in various documents and thus the detailed description thereof is omitted.

The catalyst of the present invention may be used in, for example, a phosphoric acid fuel cell, a polymer electrolyte membrane fuel cell, and a direct methanol fuel cell. There are no particular limitations to the structures and the preparation methods of these fuel cells. Illustrative examples are disclosed in various documents and thus the detailed descriptions thereof are omitted.

Hereinafter, the present invention will be described in more detail with reference to examples but is not limited thereto.

Example 1

First Aspect of the Present Invention 0.94 g of sucrose, 3.75 g of distilled water, and 0.11 g of a 97% by weight aqueous solution of sulfuric acid were mixed to prepare a solution A. 0.63 g of TEOS, 0.63 g of ethanol, and 0.21 g of a $10^{-3}$ M aqueous solution of hydrochloric acid were mixed and stirred at 40° C. for one hour to prepare a solution B containing a silica oligomer.

1.0 g of calcined SBA-15A was impregnated with a mixture of the solution A and the solution B.

The SBA-15 so impregnated was dried at 100° C. for 6 hours and again heated at 160° C. for 6 hours. The heated SBA-15 was once again subjected to the above processes except that the amount of each of the solution A and the solution B was reduced to 60%.

The obtained SBA-15 was heated at 900° C. under a nitrogen atmosphere for two hours.

Then, the SBA-15 was added into a mixed HF—$H_2O$—EtOH solution (10% by weight of HF, 10% by weight of $H_2O$, 80% by weight of EtOH) and stirred at room temperature for two hours. The resultant was filtered and washed with deionized secondary distilled water five times. The stirring, filtering, and washing were repeated twice. The carbon molecular sieve that was finally obtained, was dried at 100° C. for 12 hours.

Figure 1B:
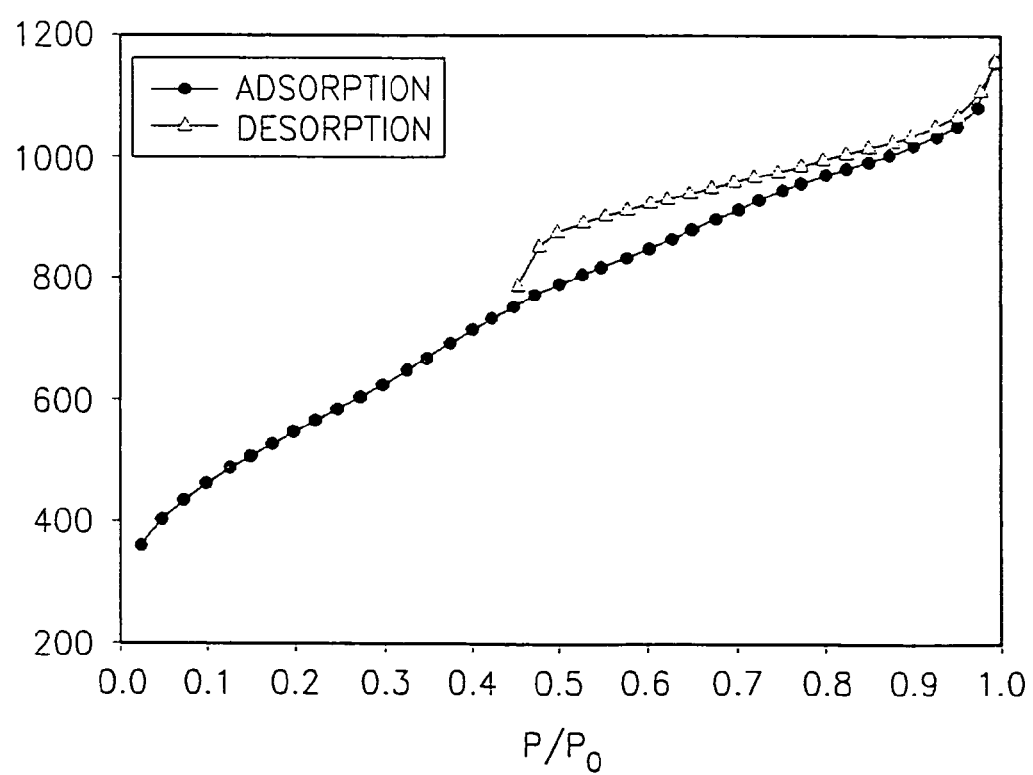
FIG. 1B is a nitrogen adsorption-desorption curve of a carbon molecular sieve according to an embodiment of the present invention.

An X-ray diffraction (XRD) pattern and a nitrogen adsorption-desorption curve of the carbon molecular sieve of Example 1 are shown in FIG. 1A and FIG. 1B, respectively. In addition, the porosity of the carbon molecular sieve of Example 1 was measured and the result is presented in Table 1.

TABLE 1

| Sample | Surface area $(m^2/g)$ | Total pore volume (<80 nm) $(cm^3/g)$ | Mesopore volume (1-80 nm) $(cm^3/g)$ | Micropore volume (<1 nm) $(cm^3/g)$ | Microporosity |
|---|---|---|---|---|---|
| CMK-3 | 1480 | 1.44 | 0.99 | 0.45 | 0.31 |
| Example 1 | 1950 | 1.67 | 1.05 | 0.62 | 0.37 |
| Increased effect | 32% | 16% | 6% | 38% | 20% |

The result of porosity of CMK-3, a carbon molecular sieve of Korean Patent Application Laid-Open Publication No. 2002-84372 is also presented in Table 1. CMK-3 is a carbon molecular sieve using sucrose as a carbon precursor and SBA-15 as a template. A silica oligomer was not used in CMK-3 manufacturing as disclosed in the cited reference.

A surface area, a total volume of pores with a size of 80 nm or less, a volume of mesopores with a size of 1 to 80 nm, a volume of micropores with a size of 1 nm or less, and a microporosity, i.e., the ratio of the micropore volume to the total pore volume, of each carbon molecular sieve are listed in Table 1.

In the carbon molecular sieve of Example 1, a surface area was increased by about 32%, a total pore volume by about 16%, a mesopore volume by about 6%, a micropore volume by about 38%, and microporsosity by about 20%, when compared to CMK-3.

It can be seen from the results that the use of a silica oligomer can increase the porosity or microporosity of the carbon molecular sieve, and the microporosity of the carbon molecular sieve can be adjusted by controlling the amount or size of a silica oligomer.

Example 2

Second Embodiment of the Present Invention 1.0 g of calcined SBA-15 was impregnated with a first mixture of 0.125 g of sucrose, 0.014 g of a 97% by weight aqueous solution of sulfuric acid, and 0.5 g of distilled water.

The impregnated SBA-15 was dried at 100° C. for 6 hours and then again heated at 160° C. for 6 hours.

1.25 g of sucrose, 0.14 g of a 97% by weight aqueous solution of sulfuric acid, and 5.0 g of distilled water were mixed to prepare a solution A. 0.75 g of TEOS, 0.25 g of a $10^{-3}$ M aqueous solution of HCl, and 0.75 g of ethanol were mixed and stirred at 40° C. for one hour to prepare a solution B containing a silica oligomer.

The solution A and the solution B were mixed to prepare a second mixture. The heated SBA-15 was impregnated with the second mixture.

Then, the SBA-15 was dried at 100° C. for 6 hours and again heated at 160° C. for 6 hours. The heated SBA-15 was again impregnated with the second mixture and again underwent drying and heating.

The resultant SBA-15 was heated at 900° C. under a nitrogen atmosphere for two hours.

Thus treated SBA-15 was added into a mixed HF—$H_2O$—EtOH solution (10% by weight of HF, 10% by weight of $H_2O$, 80% by weight of EtOH) and stirred at room temperature for two hours. The resultant was filtered and washed with secondary distilled water three to five times. The stirring, filtering, and washing were repeated twice. The finally obtained carbon molecular sieve was dried at 100° C. for 12 hours.

Figure 2A:
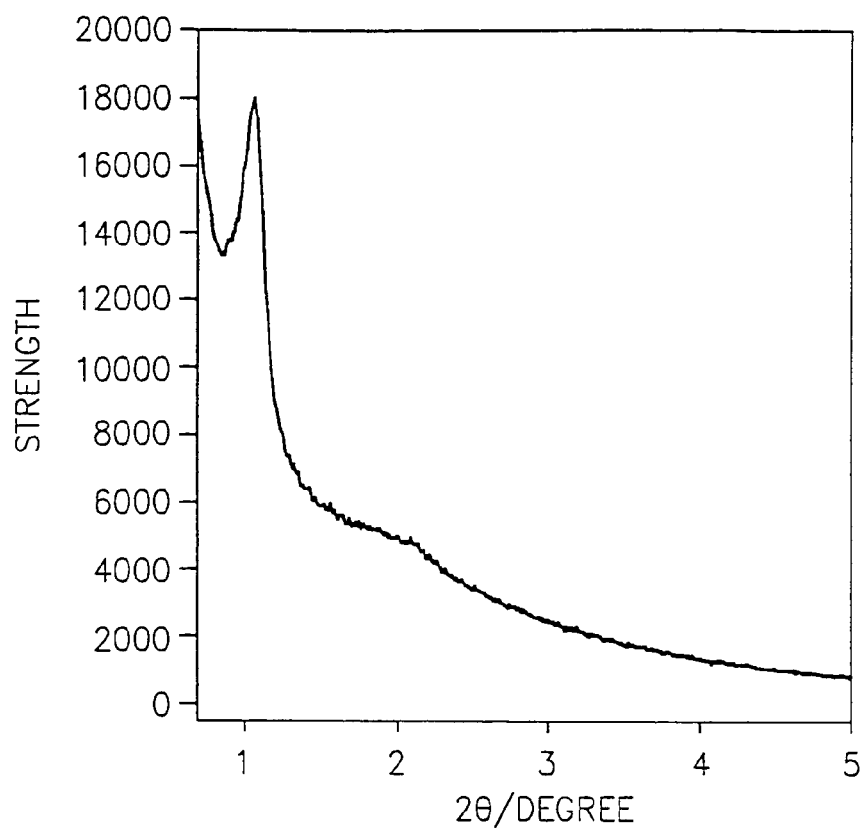
FIG. 2A is an XRD pattern of a carbon molecular sieve according to another embodiment of the present invention.
Figure 2B:
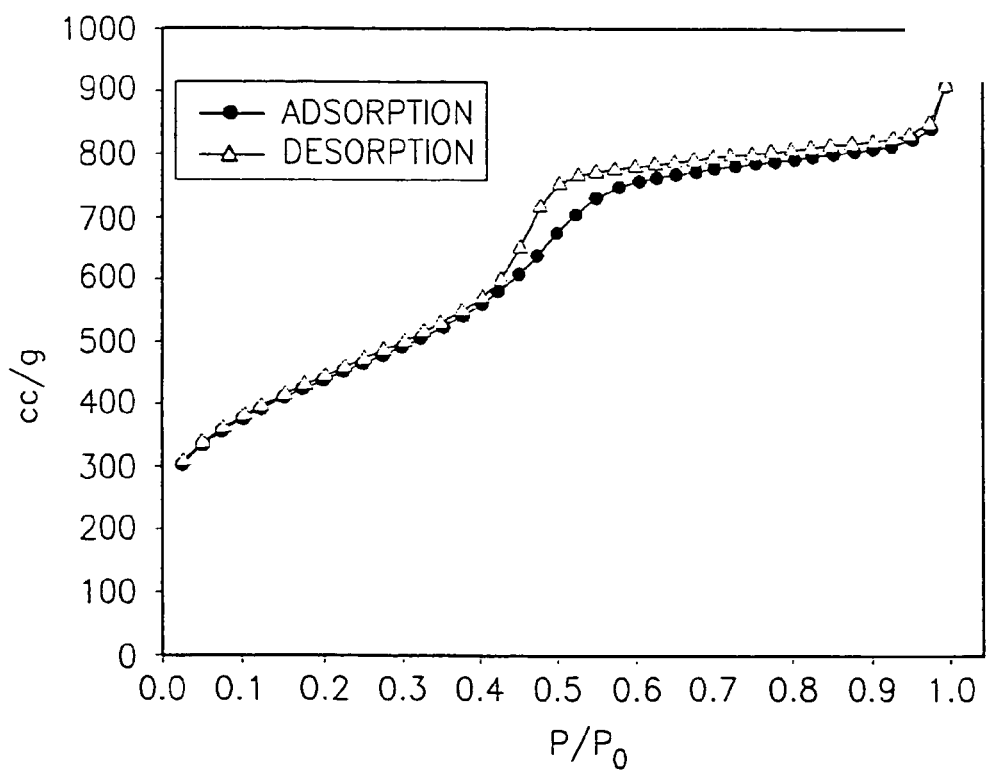
FIG. 2B is a nitrogen adsorption-desorption curve of a carbon molecular sieve according to another embodiment of the present invention.

An XRD pattern and a nitrogen adsorption-desorption curve of the carbon molecular sieve of Example 2 are shown in FIG. 2A and FIG. 2B, respectively. In addition, the porosity of the carbon molecular sieve of Example 2 was measured and the result is presented in Table 2.

TABLE 2

| Sample | Surface area ($m^2/g$) | Total pore volume (<80 nm) ($cm^3/g$) | Mesopore volume (1-80 nm) ($cm^3/g$) | Micropore volume (<1 nm) ($cm^3/g$) | Microporosity |
|---|---|---|---|---|---|
| CMK-3 | 1480 | 1.44 | 0.99 | 0.45 | 0.31 |
| Example 2 | 1513 | 1.56 | 1.00 | 0.56 | 0.36 |
| Increased effect | 2% | 8% | 1% | 24% | 20% |

As shown in Table 2, in the carbon molecular sieve of Example 2, a surface area was increased by about 2%, a total pore volume by about 8%, a mesopore volume by about 1%, a micropore-volume by about 24%, and microporsosity by about 20%, when compared to CMK-3. These results again demonstrate that use of a silica oligomer can increase the porosity or microporosity of the carbon molecular sieve.

Referring to FIG. 2A, a peak was observed at about 2 degrees. This indicates that carbon meso-rods for the carbon molecular sieve of Example 2 are regularly arranged.

Accordingly, the carbon molecular sieve, manufactured according to the second aspect of the present invention, has increased microporosity and maintains the strength of carbon micro-rods sufficient to provide connection between carbon meso-rods.

Example 3

Catalyst for Fuel Cell 1 g of the carbon molecular sieve of Example 2 was put into a plastic envelope. Then, a solution of 1.099 g of $H_2PtCl_6$ in 1 ml of acetone was added to the plastic envelope and mixed for 5 to 10 minutes. The resultant mixture was dried in the air for four hours. The dried carbon carrier was transferred to a crucible and again dried at 60° C. The crucible was placed in an electric furnace and a nitrogen gas was fed into the furnace for 10 minutes. The nitrogen gas was then replaced with a hydrogen gas and then catalyst reduction was carried out at 200° C. After the hydrogen gas was again replaced with a nitrogen gas, the temperature of the furnace was raised to 250° C. for 10 minutes, maintained at that temperature for two hours, and cooled to room temperature.

A slurry containing the Pt/C catalyst thus prepared, a commercially available ionomer, and isopropyl alcohol (IPA) was coated on a carbon paper using a spray method so that the loading of Pt reached 3 mg/cm², and then heated to prepare a cathode. As for an anode, a commercially available Pt—Ru alloy catalyst was used and an amount of a supported catalyst was 8 mg/cm². Nafion 115 (Dupont) was used as an electrolyte membrane. A 2 M solution of aqueous methanol and air were fed into the unit cell so prepared and the performance of the cell was measured.

Comparative Example 1

Use of Carbon Black

A unit cell was prepared in the same manner as in Example 3, except that for preparation of a cathode, a Pt/C catalyst (E-TEK) containing activated carbon powder as a catalyst carrier, instead of a carbon molecular sieve, was used and the loading of platinum supported catalyst was 3 mg/cm². The performance of the unit cell was measured in the same manner as in Example 3.

A current density of each fuel cell of Example 3 and Comparative example 1 was measured at a cell voltage of 0.3 V. According to the results, a fuel cell of Example 3 exhibited a current density of 112 mA/cm², whereas a fuel cell of Comparative example 1 exhibited a current density of 85 mA/cm². It can be seen from the results that a carbon molecular sieve of the present invention has improved catalytic activity, when compared to a conventional activated carbon powder.

As apparent from the above description, a carbon molecular sieve manufactured according to the first aspect of the present invention has increased surface area and/or microporosity.

A carbon molecular sieve manufactured according to the second aspect of the present invention has increased surface area and/or microporosity, while simultaneously maintaining the structural regularity.

The carbon molecular sieve of the present invention can be more effectively used as a catalyst carrier that supports catalytic metals because of the increased surface area and/or microporosity.

A catalyst using the carbon molecular sieve of the present invention as a catalyst carrier and a fuel cell using the catalyst exhibit enhanced catalytic activity and efficiency, when compared to using a conventional activated carbon powder as a catalyst carrier.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A carbon molecular sieve having first plurality of pores of a first size range and second plurality of pores of a second size range,
    wherein the second plurality of pores of a second size range have a size of less than 1 nm and the first plurality of pores of a first size range have a size of 1 nm to about 80 nm, and
    wherein the volume of the second plurality of pores of a second size range is about 0.56 $cm^3/g$ to about 0.62 $cm^3/g$, the porosity of the second plurality of pores of a second size range is about 36% to about 37%, and the total volume of pores is about 1.56 $cm^3/g$ to about 1.67 $cm^3/g$,
    wherein the surface area of the carbon molecular sieve is 1513 $m^2/g$ to 1950 $m^2/g$.

2. The carbon molecular sieve according to claim 1, wherein the carbon molecular sieve comprises carbon meso-rods and carbon micro-rods, the carbon micro-rods providing connections between the carbon meso-rods, and the carbon meso-rods forming an internal structure while in a state of being supported by the carbon micro-rods.

3. The carbon molecular sieve according to claim 1, wherein carbon meso-rods and carbon micro-rods are provided, and wherein the carbon micro-rods connect the carbon meso-rods which have a diameter corresponding to the size of the first plurality of pores of a first size range of a template used to form the molecular sieve.

4. The carbon molecular sieve according to claim 3, wherein spaces between the carbon meso-rods provide substantially uniform sized first plurality of pores of a first size range.

* * * * *